United States Patent [19]

Frieder et al.

[11] Patent Number: 4,846,913
[45] Date of Patent: Jul. 11, 1989

[54] METHOD FOR MAKING BIFOCAL LENS

[75] Inventors: Philip M. Frieder, Miami; J. Edward deRojas, Lauderhill, both of Fla.

[73] Assignee: Optical Systems International Inc., Hialeah, Fla.

[21] Appl. No.: 790,403

[22] Filed: Oct. 23, 1985

Related U.S. Application Data

[63] Continuation-in-part of Ser. No. 468,700, Feb. 22, 1983.

[51] Int. Cl.⁴ ............................................. B29C 39/20
[52] U.S. Cl. ..................................... 156/242; 264/1.7; 264/1.8; 351/159; 351/164; 351/168; 351/172
[58] Field of Search ................ 156/242; 351/159, 164, 351/168, 169, 170, 171, 172; 264/1.7, 1.8

[56] References Cited

U.S. PATENT DOCUMENTS

| | | | |
|---|---|---|---|
| 2,209,587 | 7/1940 | Tillyer | 351/172 |
| 3,877,798 | 4/1975 | Tolar et al. | 351/172 |
| 4,095,772 | 6/1978 | Weber | 264/1.8 |
| 4,522,993 | 6/1985 | Sasagawa et al. | 351/168 |
| 4,528,351 | 7/1985 | Tarumi et al. | 351/168 |
| 4,547,049 | 10/1985 | Cotie | 351/168 |

FOREIGN PATENT DOCUMENTS

| | | | |
|---|---|---|---|
| 10742 | 1/1977 | Japan | 351/168 |
| 77738 | 6/1977 | Japan | 351/159 |
| 120217 | 7/1983 | Japan | 351/168 |
| 338555 | 11/1930 | United Kingdom | 351/164 |

Primary Examiner—Caleb Weston

[57] ABSTRACT

Apparatus and a method of making an eyeglass lens module in which two lens components are disclosed. The first component is a conventional single vision stock lens having conventional corrections in the negative or positive diopter range. The second lens component is an overlay lens desirably formed from a plastic or glass and is as thin as practical. The overlays are in modules containing bifocals or trifocals or vocational modifications of a given diopter correction. The method of casting the overlaid lens includes aging a mixture of a plastic monomer and an inorganic peroxide catalyst prior to use. The two lens components are then optically and physically bonded together. Once the two lens components are secured to each other, they can then be fitted into a spectacle frame and delivered to the patient. When tinting is required, the plastic overlay can be readily tinted by conventional dye and methods.

13 Claims, 2 Drawing Sheets $F_1 = 0.00$
$F_2 = 0.00$ } $F_v = 0.00$
$F_3 = 0.00$
$F_4 = -8.75$ } $F_v = -8.75$ $F_{vc} = -8.75$ ⊃ BIFOCAL $F_1 = +8.75$
$F_2 = -8.75$ } $F_v = 0.00$
$F_3 = +8.75$
$F_4 = 0.00$ } $F_v = +8.75$ $F_{vc} = +8.75$ ⊃ BIFOCAL $F_1 = +8.75$
$F_2 = -8.75$ } $F_v = 0.00$
$F_3 = +8.75$
$F_4 = -6.00$ } $F_v = +2.75$ $F_{vc} = +2.75$ ⊃ BIFOCAL $F_1 = +6.00$
$F_2 = -6.00$ } $F_v = 0.00$
$F_3 = +6.00$
$F_4 = -6.00$ } $F_v = 0.00$ $F_{vc} = 0.00$ ⊃ BIFOCAL

METHOD FOR MAKING BIFOCAL LENS

CROSS-REFERENCE TO RELATED APPLICATIONS

This application is a continuation-in-part application of earlier application Ser. No. 468,700 filed Feb. 22, 1983 by the same inventor herein entitled "EYEGLASS LENS MODULES AND METHOD."

FIELD OF THE INVENTION

The present invention relates to the prescribing and forming of spectacle lenses having particular utility where bifocal corrections are required. In addition, the present invention relates to a method for manufacturing a bifocal lens and the bifocal lens made from that process.

SUMMARY OF THE PRIOR ART

At the present time, most practicing opticians, optometrists and ophthamologists have in stock, single vision spectacle lenses with given curvatures and corrections. These can range from plano to −12.00 diopters, and plano to +12.00 diopters. It is also possible for these ranges to extend to higher powers, but it is recognized that the standard operating procedure within the ophthalmic industry is to carry only the lower power lenses as described.

Spectacle retailers carry a range of stock lenses in inventory having the capacity to make spectacles for normally thirty percent of their patients. However, when other patients require a bifocal lens, the retailer must order the lens from a wholesale grinding laboratory because his inventory of stock lenses is only capable of filling single vision prescriptions. The prior art necessitates the use of a grinding laboratory because it would be impossible to carry in stock all the possible combinations of prescriptions, in addition to all of the possible bifocal locations resulting from each patient's particular facial measurements. The total inventory of prior art is far beyond even the largest retailer's capabilities including those retailers having more than one thousand locations.

The present state of the art does not provide for eyeglass retailers to be able to add any available color tinting to their glass lens inventory. These lenses are sent away to special lens coating laboratories that have extremely expensive (usually up to $150,000) glass coating equipment.

Present practice and that of the prior art involves time and delay in fitting the patient with the spectacles and loss of prompt delivery of a set of glasses which are appropriate to one's prescription. Many patients with severe corrections are forced to carry one extra, or even two extra pairs of eyeglasses, or have them available since without them, their sight is limited and functional capabilities are limited.

The prior art may be found in Class 313, subclasses 478, 479; Class 350, subclasses 417, 422, 444; and Class 351, subclasses 159, 168, 172, 176 and includes U.S. Pat. Nos. 993,812; 1,267,014; 1,304,421; 1,948,636; 2,033,101; 2,330,663; 2,611,294; 3,248,460; 3,617,166; 3,628,854; 3,702,218; 3,771,858; 3,904,281; 3,917,776; 3,877,798; and 2,209,587. Further, prior-art references of foreign documents may be found in United Kingdom Patent No. 338,555 and Japan Patent Nos. 52-77738 and 52-10742.

SUMMARY OF THE INVENTION

The present invention stems from the development of an eyeglass lens module in which two lens components are formed. The first component is the conventional single vision stock lens having conventional corrections in the negative or positive diopter range and, indeed, for the patient requiring only bifocals or trifocals, the single vision stock lens can be of zero correction. The second over-lay lens component is desirably formed of a plastic or glass material and is as thin as practical. These overlays are in modules containing bifocals or trifocals or vocational modifications of a given diopter correction. They can also contain special vocational features such as upper bifocals for airline pilots. Once the prescription is developed according to the method of the invention, the optical glass lens blank is then fixtured for receiving the over-lay. Prior to shipping to the optician and the laminating or gluing procedure, a sagittal gauge is applied for inspection by the manufacturer to the posterior surface of the over-lay and the anterior surface of the single vision stock lens, to determine that their curvatures are nearly equal to insure a close physical inter-fit which, in turn, will help insure an optically acceptable bond between the two. Desirably, the lens and the overlay are cut and edged to the configurations of the frame which is selected. Optionally they can be cut and edged before or after laminating. Once the two lens components are secured optically and physically to each other they can then be fitted into the spectacle frame and delivered to the patient. Furthermore, when tinting is required the plastic over-lay can be readily tinted by conventional dye as distinguished from the expensive and time consuming coating process required with the optical glass type lens.

The present invention provides the spectacle retailer with a kit of very thin lens covers, each of which carries the particular bifocal correction required by that individual patient. By providing a kit of lens covers to be optically laminated to the eyeglass retailer's single vision inventory, the spectacle retailer is able to provide spectacles for at least 90% of his patients within one to two hours. Further, this invention permits the cover lens to be made of any lens material.

The present invention stems from the development of an eyeglass lens in which two lens components are formed. The first component is a conventional single vision stock lens having conventional correction in the negative or positive diopter range and, indeed, for the patient requiring only bifocals, the single vision stock lens can be of zero correction. The second component is a thin lens cover overlay formed optionally of plastic or glass, which is placed over the single vision lens.

Once the prescription is developed according to the method of the invention, the single vision lens is then fixed for receiving the lens cover overlay. The bifocal overlay must be precisely plano in power and even, throughout the whole lens, in thickness.

When the overlay cover lens is cast out of plastic, the casting must be done in a precise manner. When the material is CR39 or equivalent, the chemical composition of the CR-39 monomer must be mixed with several other additives so as to give stability and durability to the cover lens. The water content of the monomer must be functionally non-existent so that the shrinkage of the CR-39 plastic is constant from batch to batch. A premixing procedure to remove water content must be done to the monomer and to the catalyst. The chemicals must be mixed thoroughly and in a clean environment under proper thermal controls. This thermal stability prevents warping of the cover lens. After the casting operation has been completed, the mold assembly is deflashed, heated, then cooled rapidly thereby forcing a thermal expansion/contraction which separates the cover lens from the mold. Tapping the mold assembly assists in removing the lens. The cover lens must be within 0.0001 inches in radius to the single vision stock lens since that is the surface to be bonded to the single vision lens.

The two lens components may be secured to each other with an optical cement or glue which is glass or plastic compatible. After the lenses are cleaned and marked, they are then subjected to a U.V. bulb lamp for curing. After full cure has been achieved, the lens can be edged and tinted as any other lens and thereafter framed and delivered to the patient.

In view of the foregoing, it is the principal object of the present invention to provide the practicing spectacle retailer (usually opticians, optometrists, and ophthamologists), with a pre-selected number of lens cover overlays containing bifocal corrections. The eyeglass retailer can use his present in-house inventory of single vision glass or plastic lenses to be combined with the lens cover overlays thus permitting extensive control over the eyeglass manufacture to be in the hands of the parties who have prescribed the particular correction necessary for the patient.

A further object of the present invention is to provide the patient with eyeglasses corrected for bifocal application and also permits customized tintings in accordance with the recommendations of the eyeglass retailer and/or prescribing doctor, as well as the aesthetic taste of the patient.

A further object of the present invention is to permit fitting the patient, requiring only a bifocal correction, with spectacles or sunglass spectacles and in giving prompt delivery. A further object of the present invention is to provide the eyeglass retailer with economically competitive lens cover overlays which, when combined with his own in-house stock of single vision lenses, create bifocals at a very reasonable cost, and maximizing the productivity of the single vision lens inventory. The combined cost of the lens cover overlay and single vision lens is comparable to the usual and customary cost of the same prescription when ordered from the wholesale prescription grinding laboratory.

A further object of this invention is to provide the consumer or patient with prompt delivery in fitting of his or her prescription eyeglasses even when bifocals are involved and because all the fabrication can be done on the premises of the eyeglass retailer. The retailer in turn benefits by the improved cash flow resulting from payment when the eyeglasses are delivered.

BRIEF DESCRIPTION OF THE DRAWINGS

Further objects and advantages of the present invention will become apparent as the following description of an illustrative embodiment of both the apparatus and method proceeds, taken in conjunction with the accompanying drawings, in which.

As to each of the above, typical corrections are applied at the locations designated by the reference numerals F1, F2, F3 and F4.

DETAILED DESCRIPTION OF PREFERRED EMBODIMENTS: METHOD OF THE PRESCRIPTION

Figure 1:
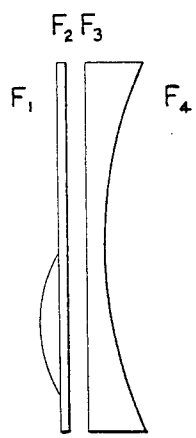
FIG. 1 is a diagrammatic view of a typical lens with a negative correction, and example of a cover over-lay lens.
Figure 2:
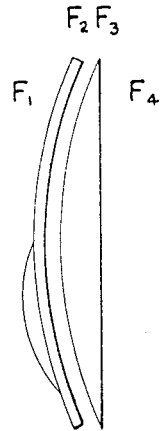
FIG. 2 is a view in the same scale as FIG. 1 illustrating a over-lay bifocal in conjunction with a lens having a positive correction.
Figure 3:
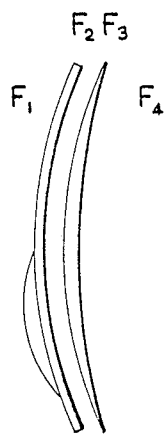
FIG. 3 is another view showing a different correction than shown in FIG. 2, but utilizing a lens having posterior and anterior curvilinearity.
Figure 4:
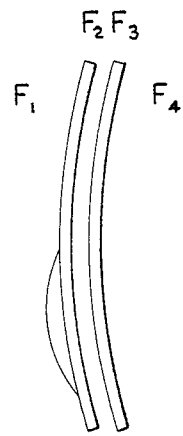
FIG. 4 is a similar example showing a typical sunglass or other eyeglass in which the principal correction is zero, with a bifocal portion.

The method of the present invention begins with the supplying of the eyeglass retailer with optical glass or plastic corrective single vision stock lenses. If the eyeglass retailer already has an inventory of these stock lenses, then he may use the ones he already has on hand.

Next the eyeglass retailer is supplied with a preselected number of over-lays lens covers having the plus diopter bifocal or trifocal corrections. The overlays are also formed with the conventionally used special vocational features used in the industry.

The eyeglass retailer then selects the appropriate single vision lens from his inventory and the appropriate bifocal, trifocal, or vocational over-lay. The over-lays are selected with respect to their bifocal or trifocal power, or other extra required features such as special vocational segment, and also with respect to their posterior curvatures. The posterior curvature of the over-lay must be very similar to the anterior curvature of the single vision stock lens for a complementary close contact fit.

OPTICIAN'S PROCEDURE

The procedure for the use of the cover lens over-lay modular system is best described by giving some examples.

| Prescription #1: | R.E. + 1.25 .75 × 90 |
|---|---|
| | L.E. + 1.75 .50 × 85 |
| | Add +2.50 bifocal, Pink #1 |
| | Frame selected: #24, size 54/18 |
| A - 54 B - 48 ED - 59 PD = 63/60 | |

A patient having this prescription in hand with the above lens powers enters the optician's office. The optician realizes the need for bifocal lenses which heretofore would have required a telephone order to the prescription grinding laboratory and a customary delay of 3 to 15 days to acquire the lenses.

Step #1

The optician selects two single vision lenses from his inventory: For the right eye a +1.25−0.75 and for the left eye a +1.75−0.50.

Step #2

Next the optician aligns these lenses in the Lensometer for the axis and centration, as usual. At this point the optician must be sure that the cylinders have been ground on the posterior surface of each lens, so that the anterior surface is spherical and can be laminated to the over-lay.

Step #3

Next the optician applies the manufactured sagittal gauged inspected lens to the anterior surface of the single vision lenses to determine the anterior surface curvature value in diopters.

Step #4

The next step is the selection of the over-lay covers having a comparable sagittal value and a bifocal power of +2.50D.

Step #5

The over-lays for this prescription must be susceptible to tinting, such as CR-39 plastic, since the prescription requires color, i.e. pink #1. The overlays are now tinted to the desired color using the same procedure for tinting CR-39 plastic lenses. Conversely a glass cover could be glued to a CR-39 base lens which is tinted.

Step #6

The over-lays are now ready for bench layout.

Determining the 'below' and 'inset'

'Below'—The desired bifocal height is measured to be 20 mm. The B measurement of the frame is 48, and when divided by 2 gives the vertical mechanical center of the frame which is 24 mm. Subtract 20 mm. the desired bifocal height, from the vertical mechanical center, 24. The result is the 'below' factor, i.e. 4 mm.

'Inset'—The frame P.D. is 54+18=72 mm. The patient's near p.D. is 60. Subtract 60 from 72 and divide the result by 2. This gives the 'inset' required. In the above example, 6 mm.

Step #7

The over-lay should now be placed over a protractor so that the bifocal is positioned 4 mm. 'below' and 6 mm. 'in' from the mechanical center. This procedure should be repeated for the right and left eyes respectively, as is the usual customary procedure in these cases.

Step #8

After the cover lens has been appropriately selected, and the base lens selected and any cylindrical correction applied to its occular side, the two components are ready for lamination. Prior to lamination it is important to clean the exterior surface of the single vision lens or underlying lens, and the interior surface of the cover lens so that cleanliness is preserved at the interface between the two when they are bonded. To this end a reciprocating stroke with a lint-free cleaning pad and cleaning solution such as acetone are applied normally from a top to bottom direction. This is done for the cover lens as well as the base lens. Thereafter the base lens is positioned on a protractor and the overlay oriented as to the proper position for laminating. The next step is to place a predetermined amount of optical glue or cement on the surface of the base lens. Once this is done, the cover is positioned on top of the base lens and slowly rocked into position. The amount of glue is sufficient to totally wet both surfaces of the two lens components, sufficient to preclude voids or bubbling, and yet limited to that amount which will not result in excessive oozing along the edges.

Thereafter, the two lens components are subjected to black light (U.V.) for about 10 to 15 seconds. This accomplishes a quick set while the two components are in the gluing fixture. Once set, the lens components can be moved from the fixture by hand and placed under a black light (U.V.) for up to one hour to accomplish a full cure.

Step #9

The thus-assembled and bonded two lens component is edge ground and secured to the eyeglass frame in essentially state of the art techniques.

THE LENS STRUCTURE

The single vision lens component is standard known in the industry today. They are generally supplied by about two dozen major manufacturers in a variety of prescription powers. These prescription powers are generally supplied in one-quarter diopter increments and in both simple and compound prescriptions. This includes corrections for hyperopia, myopia, astigmatism and aphakia. The averages of the patients are well known in the trade and therefore a larger supply of the most popular corrections is carried by eyeglass retailers.

Usually eyeglass retailers carry inventories of standard prescription single vision lenses made from either ophthalmic crown glass having an index of refraction of 1.523, or ophthalmic plastic CR-39 lens material having an index of refraction of 1.497. The present invention contemplates that there are prescriptions specially in stronger powers, which could be made significantly thinner, lighter and have more desirable cosmetic attractiveness by using ophthalmic glass having higher indexes of refraction, such as 1.701 through 1.805. The invention herein contemplates supplying the single vision lenses of higher index of refraction when needed.

The over-lay cover lens has no prescriptive power except for the special feature which it carries including, but not limited to, bifocal segments, trifocal segments, and special vocational combination segments. Since the over-lay cover lens has no power of its own, except for the special feature. This invention also contemplates that the over-lays may be mounted onto base lenses having an increased index of refraction.

Various selections from given patient prescriptions are set forth in the drawings commencing with the minus diopter corrections for the near-sighted person and progressing to the plus diopter corrections for the far-sighted person and indeed into the area of aphakia. Contemplated also are examples of the over-lay having no distance prescription power, but which carry the bifocal, trifocal, vocational, or aspheric components needed for the completion of the prescription.

THE METHOD OF CHEMICAL FORMULATION AND PROCESSING OF OVER-LAY COVER LENS

The method of the present invention requires the production of one type of overlay cover lens and thereafter laminating the cover lens overlay onto a single vision stock lens which would be supplied to the eyeglass. Where the eyeglass retailer already has an inventory of these stock single vision lenses, then he may use the ones he already has on hand.

In the method of manufacturing one type of overlay cover lens, the mold manufacturing is extremely important because the bifocal overlay cover lens must be precisely plano in power and even throughout the whole lens in thickness. The plano configuration is achieved by forming a pair of compensated matched molds. This radius of curvature of the occular surface is shortened from the radius of curvature of the anterior face by the thickness of the plano veneer. For example with a 7/10 millimeter thickness plano lens the occular surface radius of curvature is shortened by 7/10 millimeter. The back mold which provides the laminating surface must be within 0.0001 inches in radius to the single vision stock lens to which it is laminated. In order for the overlay lens to be perfectly even in thickness, the molds must be compensated as set forth above. The mold must be free of all normal mold problems such as scratches, pits, gray, fused stress, and waves, and these problems are solved by microscopic inspection of the molds and polishing with cerium oxide having a pH of 7–8 at temperatures less than 125° F. The anterior mold is made of S-1 crown glass. The posterior mold is made of 2.0 mm thick eonite glass. This thickness permits flexibility of the eonite mold to permit uniform shrinkage of the veneer lens as it is curing. The CR39 monomer is preferably injected into the mold cavity by pneumatic pressure.

The curing of the CR-39 overlay is achieved by mixing the CR-39 monomer in quantities of five hundred pounds with the following additives and quantities thereof so as to give stability and durability to the cover lens:

(a) catalyst 1PP-isopropyl per carbonate (diisopropyl peroxy dicarbonate) mixed at ambient for 3 hours as 3% by weight of CR-39 mixed thoroughly, (b) mold release agent—oil of wintergreen 0.00001% by volume, (c) mix thoroughly for 5 hours, (d) aging of mix over two weeks before using at 40° F.±5° F.

Failure to age will result in irregular shrinkage of the plastic in the mold. The aged catalyzed monomer will last for about five weeks if stored at 40° F. so that three weeks of usage can be achieved. Thereafter, a premixing procedure is used to remove water from the monomer and the catalyst. This procedure consists of vacuum degassing after the catalyst is mixed. Further, the chemicals must be mixed in a clean environment under thermal controls at 75° F. plus or minus 5° F. for a maximum of five hours with a 200–300 rpm motor for optimum quality to be insured.

Since the casting operation will vary according to the bifocal type and add power the bifocal segment thicknesses will be different depending on lens styles and reading powers, the following examples illustrate the variations with respect to different thicknesses of the veneer wafer overlay:

In order to avoid warping the overlay lens cover, after the lens material is within the mold, the molds are clamped with uniform mold clamping pressure. Thereafter the clamped molds are placed in water and the water is heated from ambient to 50° C. in about twelve hours. By experimentation shorter cycles can be achieved. The mold is then removed from the water and cooled to ambient. The mold parts are then separated. The lens cover overlay is thereafter inspected for all standard quality control parameters such as inclusions, striae, pits, gray, waving, power, and add and base radius. The lens inspectors use eye loupe's of 5x magnification in an inspection booth having a black background, a 40 watt (clear) incandescent bulb and a 40 watt fluorescent tube. Mold inspectors use a 10x magnification microscope to insure that the molds are perfect after each casting before reusing said mold.

Once the method for producing the overlay lens cover is completed, and the inspection of same is done the next step in the procedure (for a bifocal lens) includes the lamination of the overlay by the retailer onto the single vision lens. This is accomplished by the retailer with a bonding agent which is an optical cement with indexes of refraction comparable to that of the cover and single vision lenses used. Inspection of molds and lenses includes fluorescent visual inspection, polariscope inspection for stress, and arc lamp for stress. Finally the lenses are checked with a lensometer and digital spherometer to determine the add power and the radius of curvature. The radius of the cover lens must be within 0.0001 inches of the single vision lens.

Once this bonding agent combination is formed, the next step in this method is to laminate the overlay cover lens onto the single vision lens with the desired patient prescription for the single vision lens and the appropriate lens cover having the proper addition power. Prior to lamination, the lenses are cleaned with a solvent such as acetone or methylethyl ketone to insure the two lens components are free of oil, lint, dust, or dirt. Wiping the excess solvent from the lenses should be done with a lint-free tissue, commonly known under the tradename "Microwipes" or a lint-free rag.

Next, the method incorporates "spotting up" the optical center of the single vision lens and veneer wafer overlay. "Spotting up" is: Optical centration of veneer on convex side of lens with respect to the segment location and optical centration of single vision lens on the concave side of the lens. The single vision lens is spotted on the ocular or concave side of the lens. The procedure of finding the O.C. (optical center) of the single vision lens with a lensometer necessitates the dotting of spots (mostly ink) by means of three little marking pins which are part of the lensometer machine itself. The spotting must be done on the concave side of the single vision lens so as not to sandwich the spots in the middle of the component. The overlay cover lens is spotted on the anterior or convex side of the overlay as is the normal procedure for all lenses. Thereafter, recleaning with acetone or methylethyl ketone is repeated.

In order to laminate, a single sheet of soft paper (lint free) such as facial tissue is placed on a retailer's table in a standard office environment. The single vision lens is then placed on the table with the convex side up. Approximately 1 cc of the bonding agent is then applied by means of a pipette dispenser to the center of the single vision lens. The overlay cover lens is then introduced onto the single vision lens by means of a manual implementation using a side-to-side motion. After examination of the components for bubbles and bifocal height, the component is subjected to a high intensity mercury lamp or a longwave ultraviolet lamp for fifteen seconds. This fifteen second exposure allows the lens to be lifted and re-checked. If all the parameters of the prescription have been met, the lens is further cured for twenty minutes using, again, either the mercury lamp or the longwave ultraviolet lamp. Here it should be noted that a short wave light can cure the gluing, but for safety purposes it is best not used at the retail level.

After full cure has been accomplished, the lens is then edged by means of standard edging equipment used in all retail and laboratory shops. There is no need for specialized equipment or diamond wheels in order to edge these laminated lenses. The tinting, like the edging, necessitates no additional equipment or different dyes in order to tint the laminated lenses. Both operations are conventionally done and known in the industry. This product is then ready to be delivered to the patient.

Figure 5:
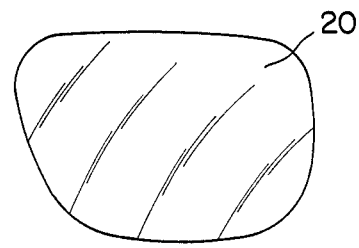
FIG. 5 is a front view of a typical single vision stock lens.
Figure 6:
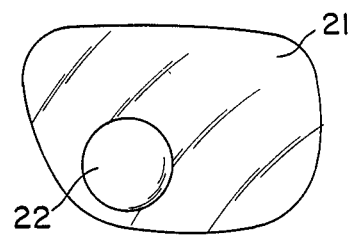
FIG. 6 is a front view of a typical single vision stock lens with the over-lay lens.
Figure 7:
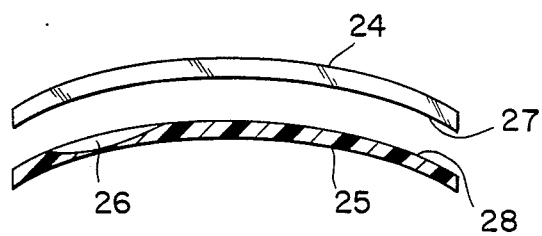
FIG. 7 shows the lens having the correction in front of the base lens with the plano lens on the occular side with a fuxed bifocal segment.

In FIG. 5 a single vision stock lens is shown 20, which comprises a complete patient prescription without bifocal corrections. In FIG. 6 a veneer overlay 21 is disclosed having plano power correction but with a desired bifocal power 22. FIG. 7 illustrates a correcting lens 24 having plus cylinder corrections mating with the plano lens 25 but with a bifocal correction 26. The surface 27 of lens 24 mates with surface 28 of plano lens 25.

Although particular embodiments of the invention have been shown and described in full here, there is no intention to thereby limit the invention to the details of such embodiments. On the contrary, the intention is to cover all modifications, alternatives, embodiments, usages and equivalents of eyeglass lens modules, as fall within the spirit and scope of the present invention, specification, and appended claims.

What is claimed is:

1. A method for assembling an eyeglass lens having two components comprising the steps of:
   casting an overlay cover lens by:
   removing water from a plastic monomer and from a catalyst comprising an organic peroxide,
   thoroughly mixing said plastic monomer and said catalyst, forming a mixed composition,
   said mixing being accomplished over a five-hour period at 70° Fahrenheit, plus or minus 5° Fahrenheit, using mixing apparatus spinning at 200 to 300 revolutions per minute (RPM),
   aging said mixed composition for two weeks at a temperature of 40° Fahrenheit, plus or minus 5° Fahrenheit,
   using a mold to cast said cover lens from said aged composition,
   selecting a single vision lens,
   and thereafter optically bonding the two lenses to each other, causing a lamination with the overlay cover lens being the exterior portion of the lens, said optical bonding including the steps of placing an optical bonding agent between the lenses and, thereafter curing the bond.

2. In the method of claim 1, said composition comprising a thermal setting allyl diglycol carbonate, isopropyl percarbonate and oil of wintergreen.

3. In the method of claim 2 above,
   raising the temperature of said mold at predetermined precise increments over an extended period of time and then lowering the temperature of said mold to the ambient temperature.

4. In the method of claim 3 above,
   said temperatures being from ambient to 50° C.,
   said precise increments being 5° C.,
   said extended period of time being 12 hours.

5. In the method of claim 3 or 4 above,
   deflashing said composition at 50° C. for two minutes,
   heating said composition at 65° C. for ninety seconds,
   and cooling said composition at 10° C. for twenty seconds.

6. In the method of claim 1 above,
   said optical bonding comprising:
   a plastic monomer in 68% ratio to 32% epoxy glue.

7. A method of claim 1 above, wherein said lamination comprises,
   cleaning said overlay cover lens and said single vision lens with acetone or methylethyl ketone and thereafter wiping with a lint-free tissue.

8. In the method of claim 7 above,
   spotting up the ocular or concave portion of said singular vision lens, and
   spotting up the anterior or convex portion of said overlay cover lens.

9. In the method of claim 1 above,
   said optical bonding agent is dispensed onto the single vision lens by means of a pipette, and
   said overlay cover lens is placed on said single vision lens for approximately one minute.

10. In the method of claim 9 above,
    aligning the axis of the lens components and thereafter subjecting said lens components to a high intensity mercury lamp or a longwave ultraviolet lamp for fifteen seconds.

11. In the method of claim 10 above,
    curing said lens components for twenty minutes using either a mercury lamp or a longwave ultraviolet lamp.

12. In the method of claim 11 above,
    tinting said component by a dyeing means.

13. In the method of claims 11 or 12 above,
    edging said component by conventional edging means.

* * * * *

UNITED STATES PATENT AND TRADEMARK OFFICE
CERTIFICATE OF CORRECTION

PATENT NO. : 4,846,913

DATED : July 11, 1989

INVENTOR(S) : Frieder, et al.

It is certified that error appears in the above-identified patent and that said Letters Patent is hereby corrected as shown below:

<u>IN THE DRAWINGS:</u>  Figure 7 should appear as shown below:

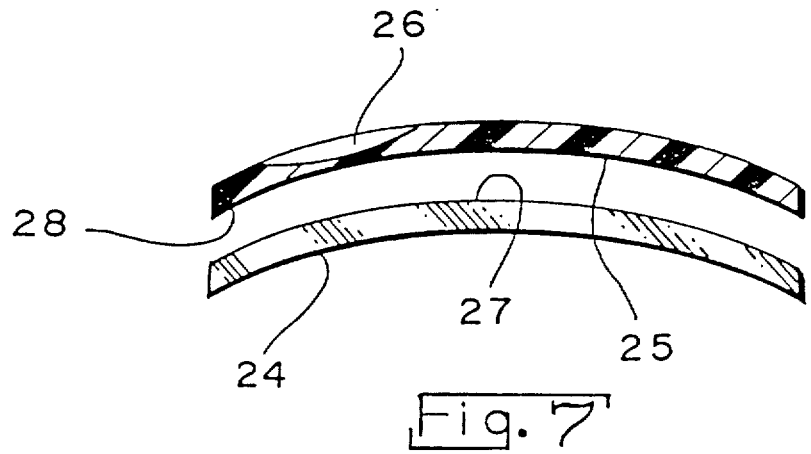

Fig. 7

UNITED STATES PATENT AND TRADEMARK OFFICE
CERTIFICATE OF CORRECTION

PATENT NO. : 4,846,913

DATED : July 11, 1989

INVENTOR(S) : Frieder, et al

It is certified that error appears in the above-identified patent and that said Letters Patent is hereby corrected as shown below:

Col. 4, lines 14-17:

FIG. 7 shows the lens having a fixed bifocal segment in front of the base lens having the diopter correction on the occular side.

Signed and Sealed this

Nineteenth Day of January, 1993

Attest:

DOUGLAS B. COMER

*Attesting Officer*      Acting Commissioner of Patents and Trademarks